United States Patent
Cook, Jr. et al.

(10) Patent No.: US 10,336,152 B1
(45) Date of Patent: *Jul. 2, 2019

(54) CONTROLLABLE LOAD DISTRIBUTION SYSTEM FOR A VEHICLE

(71) Applicants: Harrison L Cook, Jr., Shubuta, MS (US); Bradley T Robinson, Hoover, AL (US)

(72) Inventors: Harrison L Cook, Jr., Shubuta, MS (US); Bradley T Robinson, Hoover, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/395,536

(22) Filed: Dec. 30, 2016

(51) Int. Cl.
*B60G 17/016* (2006.01)
*B60G 17/052* (2006.01)
*B60G 17/015* (2006.01)
*B60G 17/019* (2006.01)

(52) U.S. Cl.
CPC ..... *B60G 17/0525* (2013.01); *B60G 17/0155* (2013.01); *B60G 17/01941* (2013.01); *B60G 2401/16* (2013.01); *B60G 2600/0422* (2013.01)

(58) Field of Classification Search
CPC ............ B60G 17/0525; B60G 17/0155; B60G 17/01941; B60G 2401/16; B60G 2600/0422; B60G 17/005; B60G 17/052; B60G 2400/252; B60G 2500/10; B60G 2400/204
USPC ...................... 701/37, 38; 280/124.16, 149.2
See application file for complete search history.

(56) References Cited

U.S. PATENT DOCUMENTS

| 5,428,470 A * | 6/1995 | Labriola, II | G01N 35/00584 398/109 |
|---|---|---|---|
| 9,272,599 B1 * | 3/2016 | Cook, Jr. | B60G 17/0528 |
| 2003/0155164 A1 * | 8/2003 | Mantini | B60G 17/005 280/149.2 |
| 2011/0187070 A1 * | 8/2011 | Hammond | B60G 17/052 280/124.16 |
| 2013/0275002 A1 * | 10/2013 | MacFarlane | B60G 17/04 701/37 |
| 2015/0273972 A1 * | 10/2015 | Plath | B60G 17/019 701/37 |

* cited by examiner

*Primary Examiner* — Shardul D Patel
(74) *Attorney, Agent, or Firm* — Peter Loffler (57) ABSTRACT

A weight distribution system for dynamically controlling and adjusting the weight load on each axle of a vehicle uses a manifold that is fluid flow disposed between a source of pressured air and the air bags of the vehicle. The manifold allows an individual air bag to be inflated or deflated independently of the other air bags to a desired pressurization depending on either preprogrammed or user input parameters or external conditions. The system can be used to raise and lower the tractor or trailer for tractor and trailer coupling and decoupling. The system can quickly change air bag pressure to try and avoid a rollover. The system can monitor road and weather conditions and adjust the vehicle suspension accordingly. The system can adjust the suspension based on vehicle speed. The system can keep the vehicle at a constant height while loading or unloading. The system can keep track of the weight of the vehicle.

20 Claims, 8 Drawing Sheets

CONTROLLABLE LOAD DISTRIBUTION SYSTEM FOR A VEHICLE

BACKGROUND OF THE INVENTION

1. Field of the Invention

The present invention relates to a load distribution system for commercial vehicles wherein the inflation and deflation of each air bag of an air suspension system of the vehicle is controlled independently and automatically, including terrain, weather and vehicle speed responsively, so as to maintain a desired pressure within each air bag so as to control the load being borne by each air bag and its axle so as to achieve optimum load distribution of the overall vehicle.

2. Background of the Prior Art

Under current United States Department of Transportation regulations, in a typical tractor-trailer combination (18 wheeler) the maximum weight load on the steering axle of the combination is 12,000 pounds, while the dual drive axle load is 34,000 pounds and the dual tandem trailer axle load is also 34,000, and the overall tractor-trailer rig cannot gross over 80,000 pounds combined. Additionally, each tire used on the typical tractor-trailer combination has a maximum load capability of 7,200 pounds so that the tires can support 14,400 pounds on the steering axle, 57,800 pounds on the drive axle and 57,800 pounds on the tandem trailer axle. Clearly, there is excess tire weight support capacity relative to the allowable load capacity on each axle.

Many modern truck and trailer manufacturers are implementing air bag suspension systems into their vehicles, turning away from the more traditional steel spring systems. Air bags tend to be lighter, more reliable, more efficient, have a lower natural frequency so as to produce a smoother and more comfortable ride for driver, vehicle, and cargo alike thereby reducing fatigue and minimizing the risk of damage respectively, and tend to reduce wear and tear on various components of the vehicle, among other benefits of air bag suspension systems. The weight of the vehicle and its load is transferred to the axles and thus the tires via a series of air bags, two air bags per axle. The air bags are pressurized and thereby suspend the weight of the vehicle. Modern air bag systems have appropriate sensors and leveling valves that work together to allow the chassis of the vehicle to remain level as the weight shifts as well as to remain at an optimal ride height. Modern air bag suspension systems may also have weight sensors to be able to detect an overload condition on a given axle, issuing an alarm if an overload condition is detected, allowing the operator to take corrective measures.

In an 80,000 pound gross maximum weight configuration for a tractor-trailer rig, as few as twelve 7,200 pound weight supportable tires can be utilized to support the 80,000 gross weight of the overall tractor-trailer combination, which means that more tires are being used on an 18-wheel tractor trailer combination than is required. Such extra tires increase the overall costs of rig operation in that the tires and wheel set themselves cost money to purchase and maintain. Additionally, the additional tires on the rig increase the rolling resistance of the rig which decreases fuel efficiency of the rig.

It would seem obvious to remove some of the tires from the tractor-trailer combination to save the costs associated with using the extra tires while still maintaining the sufficient tire weight bearing capacity required. However, this is not as easy as it seems. The load of the tractor-trailer is not uniform throughout the overall length of the rig, if the load were uniform, then tire removal might be possible. The non-uniform weight distribution on the tractor-trailer means that some axles bear more of the weight than other axles so that if tires were removed from a particular axle and that axle bore more weight for a given load relative to other axles, an over-weight-capacity issue could be created, which can be dangerous.

Therefore, in order to be able to achieve tire removal from a tractor-trailer combination, and realize the attendant savings associated with such tire removal, it is necessary to control the weight distribution at each axle whereat a tire is removed so as to prevent overloading the remaining tires on such axle.

Some prior art systems have been proposed to better distribute weight load on each axle via so-called suspension slider systems. While effective for their intended purpose, such systems are designed to move weight loading onto or away from the tractor depending on the circumstances of a given load. Additionally, such systems are manual in operation and time-consuming to use.

In U.S. Pat. No. 9,272,599, and incorporated herein by reference, we disclosed a system whereby the weight load imposed on a given axle of a tractor-trailer combination or even a standalone truck such as a dump truck is be controlled so as to allow the removal of one or more of the tires from the vehicle without fear of overloading the axle wherefrom the wheel is removed. Our a system is automatic in its operation so that vehicle operator or mechanic input is not necessary once the system is properly installed. Our system is dynamic so that weight load distribution on the vehicle is automatically adjusted depending on the given conditions of a particular weight load.

SUMMARY OF THE INVENTION

The controllable weight distribution system for a vehicle of the present invention continues the development and versatility of the system we disclosed in U.S. Pat. No. 9,272,599. Specifically, the present invention, in addition to the benefits already noted in our patent, allows the tractor and/or trailer to be raised or lowered while at rest in order to allow quick and easy tractor and trailer coupling and decoupling without the need to manually manipulate the landing gear of the trailer. The present invention senses a load shift to one side of the vehicle with the attendant mismatch of ride height between the two sides of the vehicle indicating a possible rollover. When a possible rollover is sensed, the system takes quick and immediate action by adding air to some air bags and removing air from others to try and avert the rollover. The system can be coupled to a GPS system so that either roadway conditions or weather conditions or both occasioned by the vehicle based on its GPS location can be input into the system in order to adjust the vehicle's suspension based on such input conditions. The system can automatically raise the vehicle at lower speeds and lower the vehicle at higher speeds, taking readings either from the tractor's speedometer or from the GPS unit. The system can maintain the trailer at constant height when it is being loaded and unloaded in order to allow ingress into and egress from the trailer by fork lifts and other vehicles and devices. The system can measure the overall weight of the vehicle during loading to assure it is not over loaded.

The controllable weight distribution system for a vehicle of the present invention is comprised of a manifold that is fluid flow connected to a source of pressurized air. The manifold is also fluid flow connected, independently to each of the plurality of air bags such that the manifold can add air or remove air from each of the air bags independently of the other air bags. Each air bag has a pressure sensor connected thereto for measuring a pressure of the respective air bag. The measured pressure is issued as a pressure reading and communicated to a control system. Each air bag also has a height sensor associated with the air bag such that each height sensor measures a ride height with the measured ride height issued as a ride height reading and communicated to the control system. The control system is signal connected to each of the pressure sensors (for receiving the pressure readings therefrom) and to the height sensors (for receiving the ride height readings therefrom) and to the manifold for controlling operation of the manifold based on a calculation of a data set such that each pressure reading and each ride height reading are part of the data set. When a first portion of the pressure sensors each issue their pressure reading to the control system indicating a drop in the pressure measurement of the first portion of pressure sensors and a second portion of the pressure sensors issues their pressure reading to the control system indicating a rise in the pressure measurement of the second portion of pressure sensors, the control system issues a change signal to the manifold for the system to add air to the air bags associated with the second portion of pressure sensors. When a first portion of the height sensors each issue their ride height reading to the control system indicating a drop in the ride height measurement of the first portion of height sensors and a second portion of the height sensors issues their reading to the control system indicating a rise in the ride height measurement of the second portion of height sensors, the control system issues a change signal to the manifold for the system to add air to the air bags associated with the first portion of height sensors. A GPS unit is in signal communication with the control system such that the GPS unit issues a GPS signal to the control system which GPS signal is a part of the data set. A roadway condition system that receives the GPS signal and calculates a roadway condition for the location as determined from the GPS signal and issues a roadway condition signal and communicates the roadway condition signal to the control system which roadway condition signal is a part of the data set. A weather condition system receives the GPS signal and calculates a weather condition based on the location as determined by the GPS signal and issues a weather condition signal and communicates the roadway condition signal to the control system which weather condition signal is a part of the data set. A speedometer (the vehicle's speedometer, calculated by the GPS unit, or other device) is in signal communication with the control system and measures a speed of the vehicle and issues a speed signal based on the measured speed and communicates the speed signal to the control system which speed signal is a part of the data set. An input device (keyboard, touch screen, handheld electronic device, remote signal generator, etc.,) is signal connected to the control system such that the input device issues override input that is communicated to the control system such that when the control system receives the override input, the control system overrides at least some part of the set of data and uses the override input to control the manifold. A wireless transmitter, either terrestrial or satellite or combination, is in signal communication with the control system such that the control system uses the pressure input from each pressure sensor and uses each such pressure input to calculate a weight amount and sums each of the weight amounts to achieve an overall weight amount. The transmitter wirelessly transmits the overall weight amount to a receiver. A fixed height signal represents a fixed height and is issued to the control system such that the control system continually poles each of the height sensors for their respective ride height readings and compares the ride height reading for each height sensor against the fixed height and if there is a differential between the two, then the control system issues a signal to the system so that the air bag associated with the particular height sensor has air either added or removed from that air bag until the ride height reading from that height sensor matches the fixed height.

BRIEF DESCRIPTION OF THE DRAWINGS

Similar reference numerals refer to similar parts throughout the several views of the drawings.

DESCRIPTION OF THE PREFERRED EMBODIMENT

Figure 1:
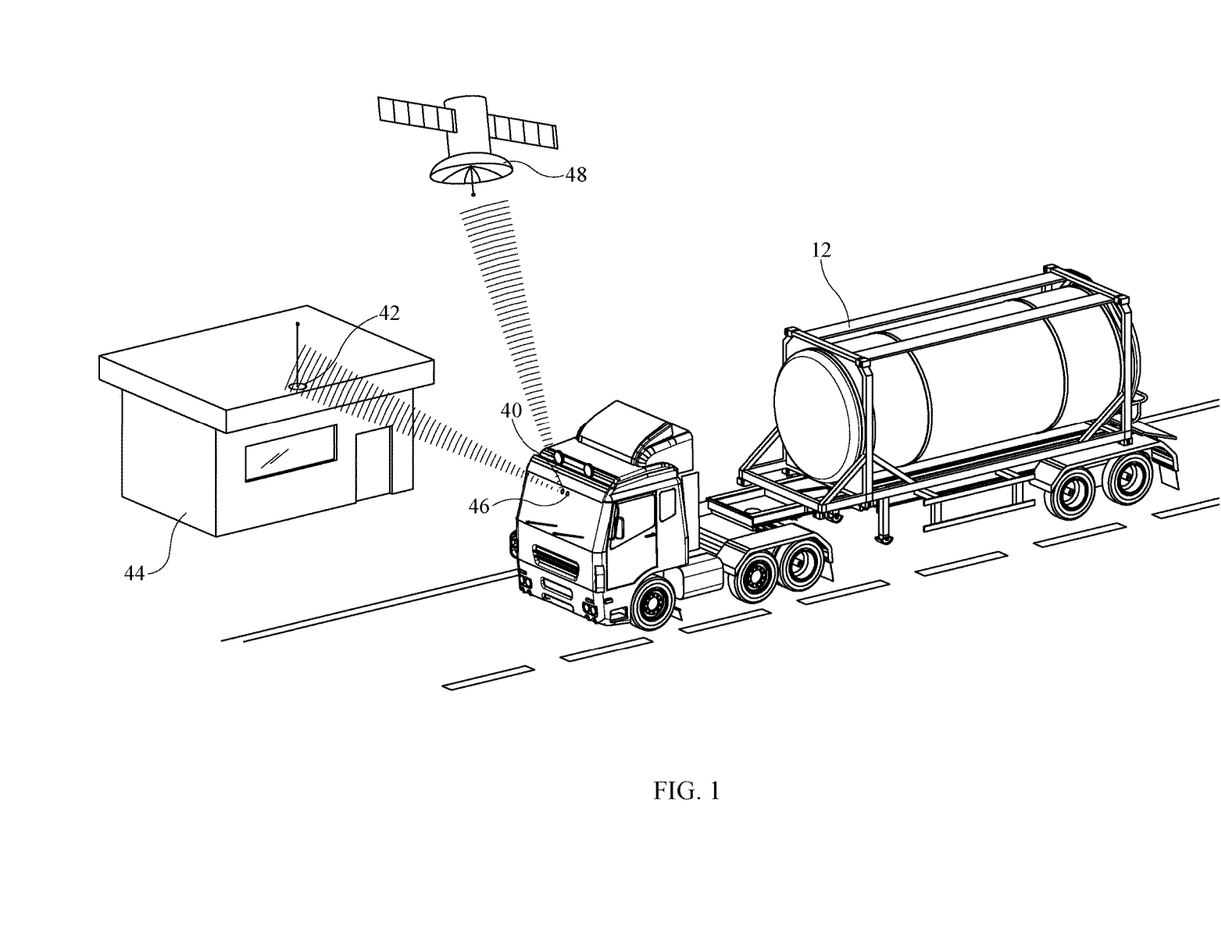
FIG. 1 is an environmental view of a tractor-trailer combination wirelessly communicating the operating parameters of the controllable weight distribution system for a vehicle of the present invention to a weigh station and to a satellite for rebroadcast to a desired terrestrial location therefrom.
Figure 2:
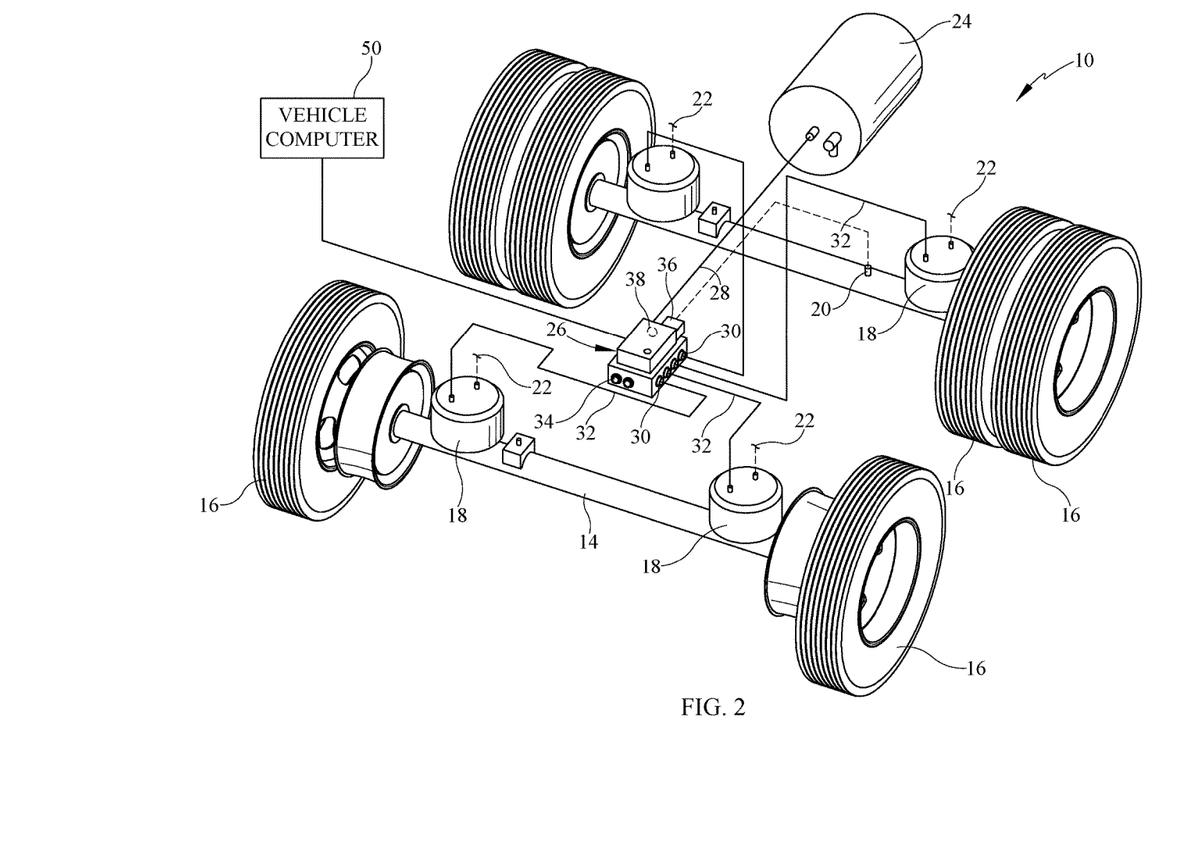
FIG. 2 is a perspective view of the controllable weight distribution system for a vehicle installed on an axle pair of the vehicle.

Referring now to the drawings, it is seen that the controllable weight distribution system for a vehicle of the present invention, generally denoted by reference numeral 10, is installed on a tractor-trailer combination 12, or even a single truck, such as a dump truck, wherein the vehicle at issue has an air bag suspension system. As seen, the vehicle has a series of axles 14 with a set of tires 16 on either side of each axle 14. In a typical modern tractor-trailer combination, there are two tires 16 on the steer axle, a total of eight tires 16 on the drive axle pair (four tires per axle) and a total of eight tires 16 on the tandem axle pair (four tires per axle)—the so-called 18 wheeler. Of course, other combinations are possible such as a tractor that has only a single drive axle or trailers that have a single axle or more than two axles, etc. As seen, each axle 14 has a pair of air bags 18 thereon, one air bag 18 on either side of the axle 14. Each air bag 18, part of the air suspension system of the vehicle 12, transfers the load of the vehicle 12 and its cargo to its respective axle 14 and thus to the tires 16 on the axle 14. Each air bag 18 has a pressure sensor 22 to monitor the pressure within each air bag 18. A height sensor 20, of any appropriate design known in the art (electrical, electromagnetic, optical, etc.,), is located on one of the axles 14 of the vehicle (or on the single axle 14 if the vehicle, such as a trailer, is a single axle vehicle). The height sensor 20 measures the distance (ride height) between the sprung weight and the unsprung weight of the vehicle, stated another way, the distance between the suspension-mounting surface (the bottom of trailer frame or slider box) to the center of the axle 14.

The vehicle 12 has an air tank 24 (source of pressurized air) which is fluid flow connected to a manifold 26 via an air hose 28, which manifold 26 can be mounted in a desired location such as proximate the air tank 24 or on one of the axles 14. The manifold 26 has a series of supply ports 30, one supply port 30 for each air bag 18 being serviced by the manifold 26 such that each supply port 30 is fluid flow connected to a respective one of the air bags 18 via an air hose 32. The manifold 26 has one or more exhaust ports 34 as well as an electronic control system 36 which controls operation of the manifold 26. The control system 36 can be a typical computer having a central processing unit, a storage device, either permanent, volatile, or both, input and output capabilities, etc.

The controllable weight distribution system for a vehicle 10 operates such that the manifold 26 can supply air to an individual air bag 18 (or multiple air bags 18) in order to increase the air pressure in the air bag 18 by opening an inlet port 38 between the manifold 26 and the air tank 24, opening the supply port 30 that is fluid flow connected to the desired air bag 18 and closing the remaining supply ports 30 and the exhaust ports 34. Air flows from the air tank 24 through the manifold 36 to the desired air bag 18 until the desired pressure within the air bag 18 is reached, as sensed by the pressure sensor 22 of that air bag 18, so that the pressure sensor sends its data to the control system 36 and the control system, recognizing that the desired pressure is in the particular air bag 18, sends a signal to the manifold to close all of the ports 30, 34, and 38. Each of the ports 30, 34, 38 is an electrically actuated valve of appropriate design and is controlled by signals from the control system 36. Similarly, the controllable weight distribution system for a vehicle 10 can decrease the air pressure within a single air bag 18 (or multiple air bags 18) by closing the inlet port 38 between the manifold 36 and the air tank 24, opening the supply port 30 for the given air bag 18 while closing the remaining supply ports 30 and opening the exhaust ports 34. Air is exhausted from the desired air bag 18 into the atmosphere by flowing from the air bag 18 and through the manifold 26, exiting the manifold 26 via the exhaust ports 34. Once the air pressure within the air bag 18 has been reduced to a desired level, all open ports 30 and 34 are closed.

The controllable weight distribution system for a vehicle 10 allows the air pressure within each air bag 18 to be individually controlled, the amount of the air pressure determining how much load is being borne by that air bag 18. Therefore, if tires 16 are removed from an axle 14 so that the maximum allowable weight load on that axle 14 is reduced, the controllable weight distribution system for a vehicle 10 adjusts the maximum pressure that can be put into the air bags 18 on that axle 14. If, due to a load shift or other factor, the weight being borne by the axle 14 with tires 16 removed exceeds its maximum weight load limit, the control system 36 senses such a condition via input from the pressure sensor 22 of the respective air bags 18 and automatically adjusts the air pressure within these air bags 18 to bring the weight load on the axle 14 to a safe limit, shifting the excess load to the other air bags 18 via a predetermined algorithm. The controllable weight distribution system for a vehicle 10 can preprogrammed by the installer so that the weight loading on each of the axles 14 that is present is based on some desired algorithm (for example, the controllable weight distribution system for a vehicle 10 can be preprogrammed so as to distribute the weight onto each axle 14 (or more precisely onto each tire 16) as uniformly as possible, irrespective of whether any tires 16 are removed or not, subject to the maximum load limits or the controllable weight distribution system for a vehicle 10 in order to distribute the loading uniformly onto each tire which helps preserve the life of the tires 16 and also helps with stopping distances of the vehicle 12, or the controllable weight distribution system for a vehicle 10 can receive input from other vehicles systems and adjust the weight distribution based on such inputs so that if such other systems sense that the roads are slick due to rain or snow, an appropriate weight distribution adjustment is made). The controllable weight distribution system for a vehicle 10 can also auto engage any extra load axles after other axles 14 have reached their full weight capacity, as may be experienced in dump trucks or heavy haul trucks that have drop down axles, for example. The control system 36 is also in signal communication with the height sensor 20 and adjusts the ride height of the vehicle as well as levels the vehicle. As air suspension systems are designed to operate at a specific ride height, the control system 36 receives ride height input from the height sensor 20 and adjusts the air suspension system as needed either supplying air (opening inlet port 38 and supply ports 30 and closing exhaust ports 34) to the air bags 18 if the ride height is too low or exhausting air (closing inlet port 38, opening supply ports 30 and opening exhaust ports 34) from the air bags 18 if the ride height is too high all the while maintaining the desired weight distribution among the air bags 18.

The distribution of weight can also be operator controlled or some combination with the preprogrammed algorithm therefore. For example, the controllable weight distribution system for a vehicle 10 can be preprogrammed as desired, however, the operator can override the programming. For example, if the operator encounters slick road conditions and the system does not adjust as desired by the operator, the operator can add more weight load onto the drive or steer axles of the tractor in or to help better control the vehicle 12. As noted, such conditions can also be input into the control system 36 by communicatively coupling the control system 36 to the vehicle's computer system (not illustrated) in appropriate fashion so as to further automate the processing by the control system 36. An appropriate input screen (keyboard based, touch screen, etc.,—none illustrated) can be provided within the cab of the tractor in order to allow the operator to control the controllable weight distribution system for a vehicle 10 if desired as well as to monitor the system with the various parameters displayed on the screen and configured as desired.

Of course controllable weight distribution system for a vehicle 10 can be used for various axle combinations including standalone trucks that have two, three or more axles, as well as trailers that have more or less than two axles and even for multiple trailer combinations. In trailer usage, each trailer will have its own manifold 26 and control system 36 with the controllable weight distribution system for a vehicle 10 having a master control system for controlling each of the individual control systems 36 of each manifold 26 (for example, one manifold control system combination on the steer axles, one manifold-control system combination on the drive axles of the tractor (or one total for the steer and drive axles), and one manifold-control system combination on the trailer). Each of the control systems 36 has its own processor onboard for performing the various calculations and issuing commands as needed and also has data storage capability for not only holding the algorithm thereon (if not in firm ware) but also for other purposes such as retaining the data throughout an operating cycle such that such data can be downloaded and analyzed as desired.

The control system 36 of the controllable weight distribution system for a vehicle 10 is integrated into the vehicle's onboard computer system called CAN (control system area network) bus system in order to allow the control system 36 to communicate its various measured parameters, especially the weight measurements to other components communicating with the CAN as well as to receive data from such other components in order to input such data into the algorithm.

The controllable weight distribution system for a vehicle 10 may also have a wireless transmitter 40 which may also be a receiver that is capable of terrestrially communicating with a receiver 42 maintained by roadway officials, such as at a typical weigh station 44 found on the various highways of this country. The control system 36 is coupled to the transmitter 40 in appropriate fashion (either hard wired or itself coupled to the transmitter wirelessly) and can send out its operating parameters (typically the overall weight of the vehicle 12 which is summed from each of the air bags 18 on the vehicle 12 using the pressure sensor 22 input for such weight calculation of each individual air bag 18 and/or the axle weights such as the steer, drive, and/or tandem axle weights either individually, grouped, or total) to the receiver 42 so that roadway officials can quickly determine whether the vehicle 12 is in compliance with regulations and if so, waive it past the weigh station 44. Of course, the receiver can be disposed within a vehicle of a roadway official so that such official can make the weight compliance determinations while cruising the highways during his or her routine. This not only helps increase the overall safety on the highways by helping assure that trucks are in weight compliance more dynamically, but also increases transportation efficiency by reducing the need for trucks to stop at weigh stations 44, thereby reducing the operator's downtime.

Additionally, the control system 36 communicates its various measured parameters, especially its weight measurements to the vehicle's onboard satellite communication system 46 in appropriate fashion, such as via a J1939 bus connection connected to the aforementioned CAN. This allows the vehicle 12 to transmit its weight data to the home office (or other desired location) via satellite 48 communication. The satellite communication system can be used to communicate to roadway officials instead of using terrestrial communication via the transmitter 42, if the roadway officials have such satellite communication capability.

If the pressure in a given air bag 18 measured by that air bag's pressure sensor 22 falls below a predetermined threshold—for example, the pressure reading by the pressure sensor 22 is at or near zero indicating an air leak in that air bag 18—then the control system 36 automatically discontinues sending air to that air bag 18 by closing the supply port to that air bag 18. An appropriate signal is also sent to the operator via the control system 36 and possibly also to the home office via either the transmitter 40 or the satellite communication system 46 so that corrective action can be performed. The control system 36 can also communicate to the vehicle control system 50 of the vehicle to not automatically lock up or engage the vehicle's brakes due to the air bag 18 leak.

Figure 3A:
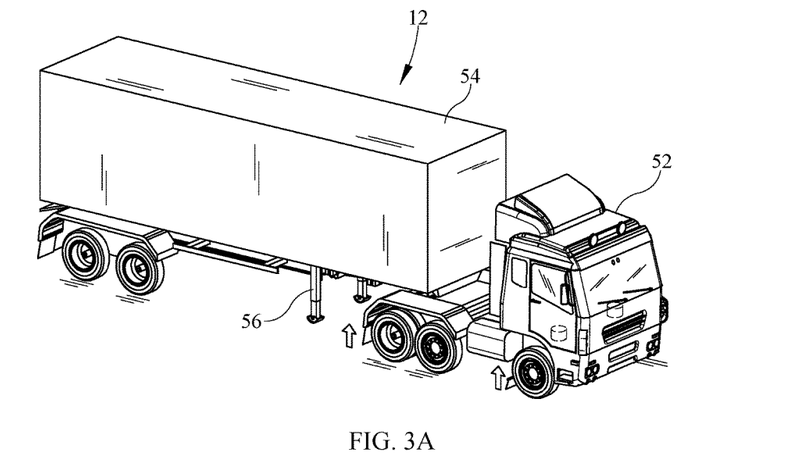
FIG. 3A is an environmental view of the controllable weight distribution system for a vehicle being used to allow a tractor to decouple from a trailer.
Figure 3B:
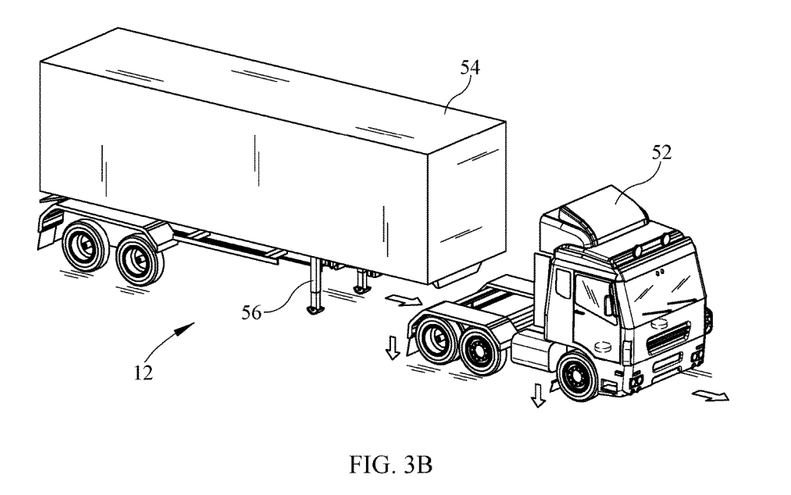
FIG. 3B is an environmental view of the controllable weight distribution system for a vehicle after the tractor has decoupled from the trailer.

FIGS. 3A and 3B illustrate use of the controllable weight distribution system for a vehicle 10 for tractor 52 engagement and disengagement from the trailer 54 of the tractor-trailer combination 12. With the landing gear 56 of the trailer 54 deployed while the tractor 52 is still connected to the trailer 54, the tractor 52 lowers the pressure in its air bags 18 while maintaining the pressure in the air bags 18 of the trailer 54, all under operator control. Once sufficient air is removed from the tractor's air bags 18 to allow the tractor 52 to move free of the trailer 54, the tractor 52 drives forward. Once the tractor 52 is free of the trailer 54, the operator can raise the height of tractor 52, if desired, by adding air to the tractor's air bags 18. When the tractor 52 needs to pick the trailer up, the tractor 52 is positioned in front of the trailer 54 in normal fashion. If needed, air is bled from the tractor's airbags 18 in order to lower the height of the tractor 52 a sufficient amount to allow the tractor 52 to back in and pick up the trailer 54. When the tractor 52 is in position with respect to the trailer 54, the tractor's air bags 18 have air added in order to raise the height of the tractor 52 in order to allow the tractor 52 to engage the trailer 54 and thereby pick up the trailer 54.

Figure 4:
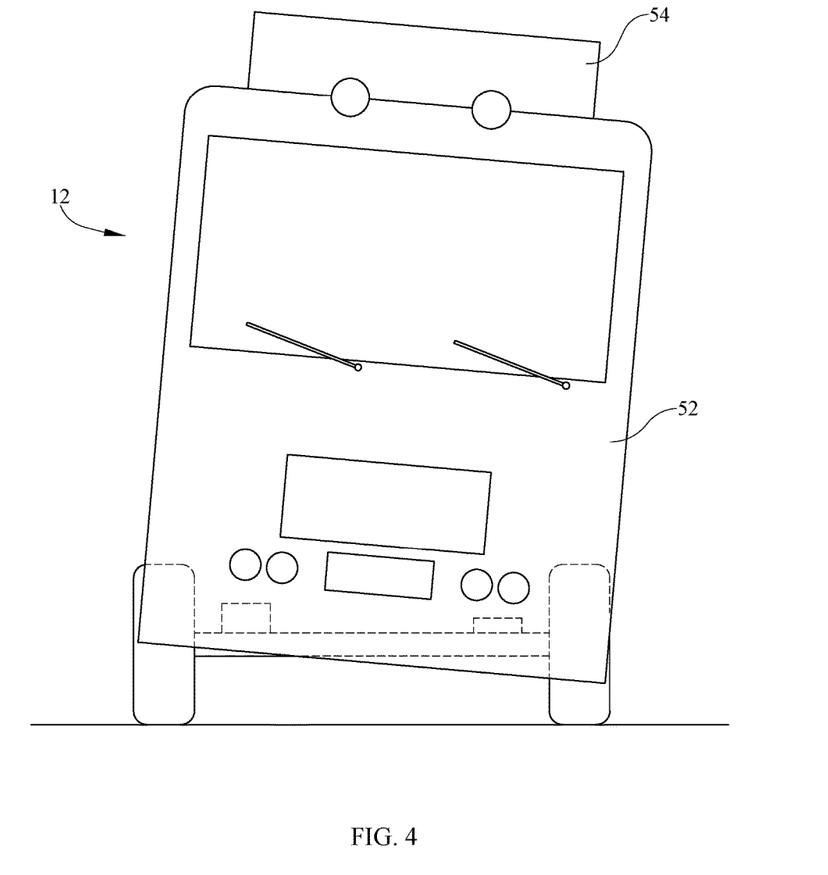
FIG. 4 is a plan view of the controllable weight distribution system for a vehicle being used to control vehicle roll.

If the tractor-trailer combination 12, or even the tractor 54 alone (or a bobtail type of arrangement), is entering a roll situation, the controllable weight distribution system for a vehicle 10 can help avoid such a situation. Typically, in a roll situation, the weight of the vehicle shifts to one side as the vehicle leans to one side, as illustrated in FIG. 4. As such, the height sensors 20 on one side of the vehicle read a much lower height (driver's side in FIG. 4) relative to the reading from the height sensors 20 on the other side of the vehicle as the vehicle leans toward the driver's side—specifically the readings from the height sensors 20 on the driver's side will suddenly decrease while the readings from the height sensors 20 on the passenger side will suddenly increase. Similarly, the pressure the sensors 22 on one side of the vehicle read a much higher pressure relative to the reading from the pressure sensors 22 on the other side of the vehicle as the weight of vehicle shifts toward the side of the lean of the vehicle—specifically the readings from the pressure sensors 22 on the driver's side will suddenly increase while the readings from the pressure sensors 22 on the passenger side will suddenly decrease. Such sudden changes in height and pressure readings are recognized by the control system 36 as a possible roll in progress and the control system issues commands to increase the pressure in the air bags 18 on the driver's side of the vehicle and decrease the pressure in the air bags 18 on the passenger side of the vehicle in order to shift weight to the passenger side of the vehicle in order to try and counteract the roll. The control system 36 may also be in communication with the vehicle yaw rate sensor and antilock brake system of the vehicle (neither illustrated) to coordinate with such systems in counteracting the roll. The specific threshold of pressure changes and height changes to trigger these roll countermeasures is vehicle, load, and configuration of the vehicle, including its air suspension, dependent. Some or all such parameters can be manually input into the control system 36 via the operator.

Figure 5:
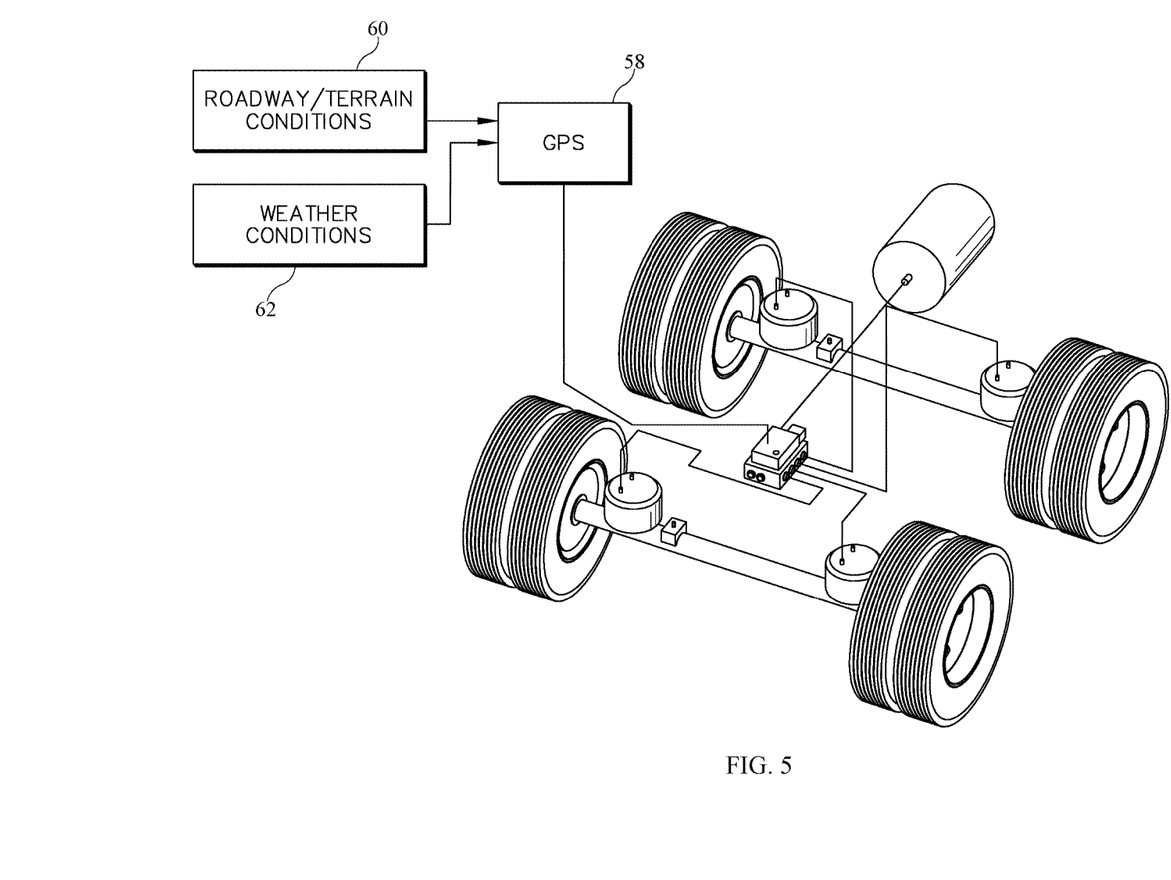
FIG. 5 is a perspective view of the controllable weight distribution system for a vehicle receiving external inputs used for control of the system.

As seen in FIG. 5, the control system of the controllable weight distribution system for a vehicle 10 can be in communication with a GPS system 58 and appropriate software that receives either roadway/terrain conditions 60 or weather conditions 62 or both and adjusts the controllable weight distribution system for a vehicle 10 automatically to account for such conditions for optimal vehicle travel in light of such conditions.

Figure 6A:
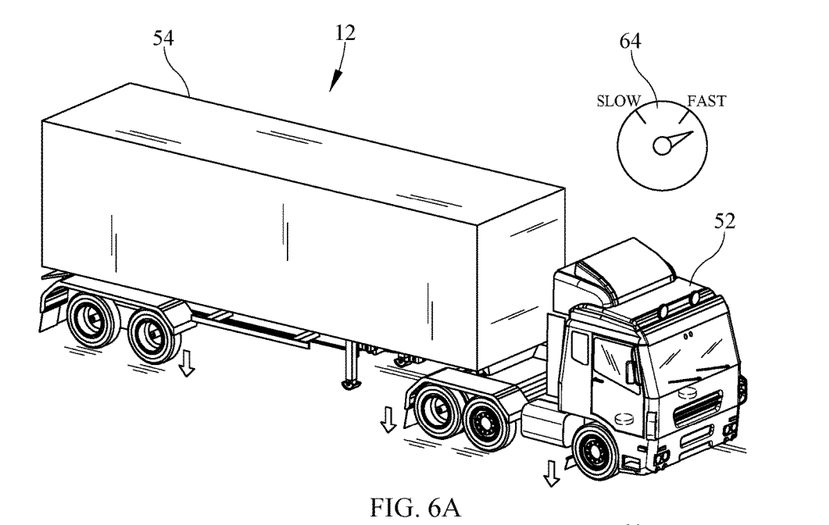
FIG. 6A is an environmental view of the controllable weight distribution system for a vehicle being used at relatively high vehicle speeds.
Figure 6B:
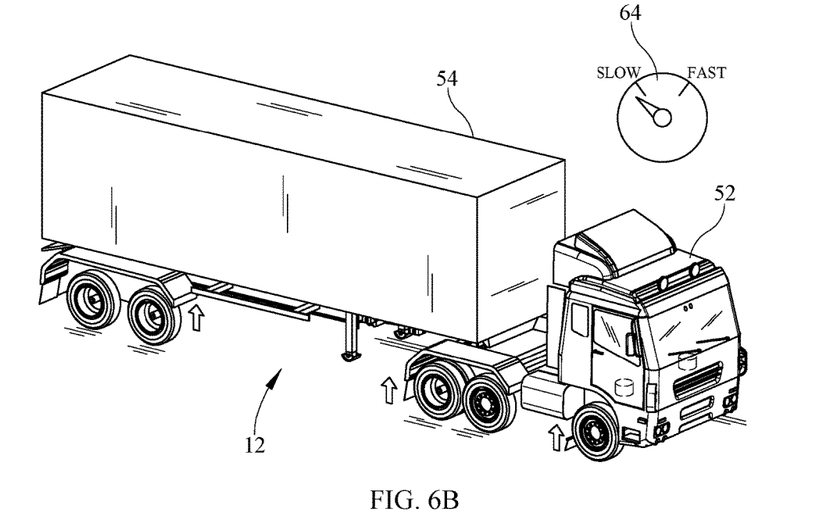
FIG. 6B is an environmental view of the controllable weight distribution system for a vehicle being used at relatively low vehicle speeds.

As seen in FIGS. 6A and 6B, the controllable weight distribution system for a vehicle 10 adjusts the entire air suspension based on speed of the vehicle. If the tractor-trailer 12 is going relatively fast as in FIG. 6A, the vehicle tractor-trailer 12 is lowered by reducing the air pressure in each air bag 18 by a given amount. Similarly, if the tractor-trailer 12 is going relatively slow as in FIG. 6B, the vehicle tractor-trailer 12 is raised by increasing the air pressure in each air bag 18 by a given amount. The amount of pressure increase or decrease is dependent on the particular speed of the tractor-trailer 12 with the control system 36 in signal communication with the speedometer of the vehicle 64 (or possibly with the GPS system 58 described previously, performing the speed measuring task).

Figure 7:
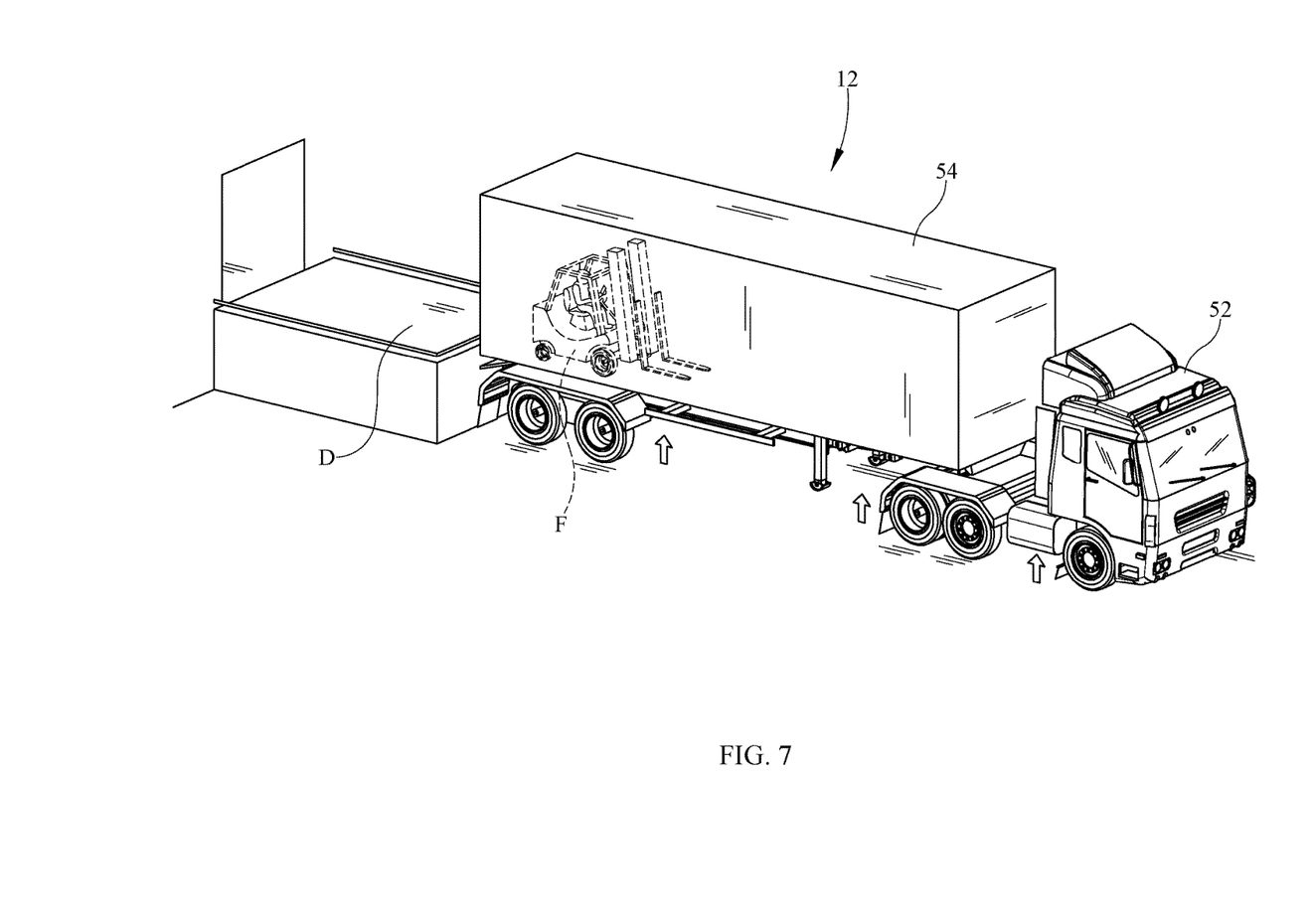
FIG. 7 is an environmental view of the controllable weight distribution system for a vehicle utilizing its self-leveling function.

As seen in FIG. 7, the controllable weight distribution system for a vehicle 10 can be configured to maintain the vehicle (either the trailer 54 or the tractor-trailer combination 12) at a constant height. If weight is introduced onto the trailer 54, such as the illustrated fork lift F driving into the trailer 54, which causes the vehicle to lowered somewhat due to this added weight, the controllable weight distribution system for a vehicle 10 automatically adds pressure to the appropriate air bags 18 in order to raise the height of the vehicle so that a step or bump is not created for the fork lift F (hand cart, etc.) when it backs out of the trailer 54 onto a loading dock D, for example.

Figure 8:
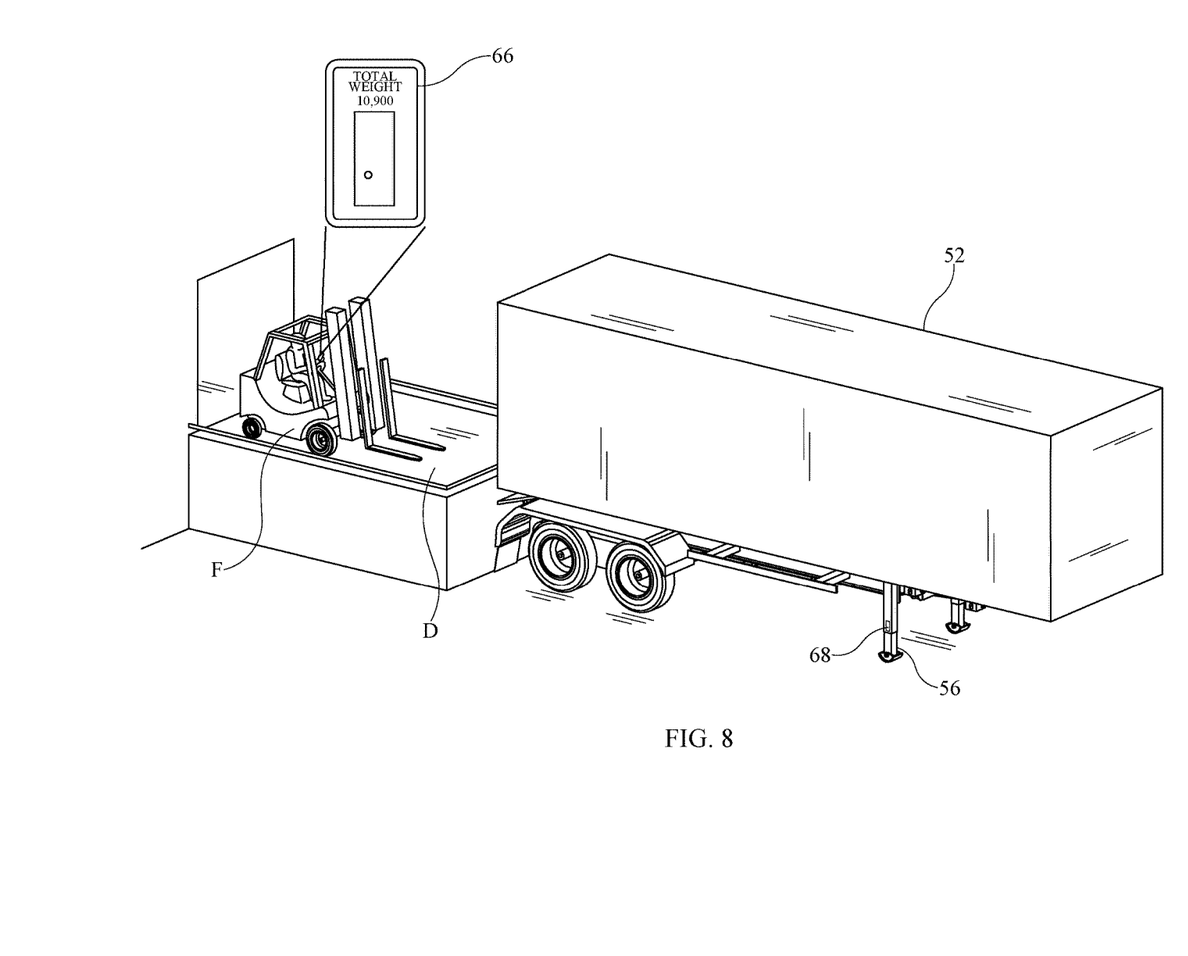
FIG. 8 is an environmental view of the controllable weight distribution system for a vehicle measuring its load weight during loading.

As seen in FIG. 8, the controllable weight distribution system for a vehicle 10 can communicate via its transmitter 40 to an appropriate local receiver laden device, such as possibly a simple handheld computer or other handheld electronic device such as the illustrated cell phone 66. In this way, a worker, such as the fork lift F operator can read the overall weight of the vehicle, and possibly its distribution within the vehicle, to assure it is not overloaded and is balanced as needed. If the trailer 54 is being loaded without being connected to its tractor 52, then load sensors 68 can be added to the landing gear 56 to get an overall weight reading of the trailer 54. Once the trailer 54 is hooked up to its tractor 52, then a final overall weight measure can be taken.

While the invention has been particularly shown and described with reference to an embodiment thereof, it will be appreciated by those skilled in the art that various changes in form and detail may be made without departing from the spirit and scope of the invention.

We claim:

1. A weight distribution system for a vehicle, the vehicle having a plurality of axles, each axle having a pair of suspension air bags thereon for supporting the weight of the truck onto the axle, the vehicle also having a control system area network that is connected to a set of components of the vehicle, the weight distribution system comprising:
   a manifold adapted to be in fluid flow communication with a source of pressurized air, the manifold also in fluid flow communication, independently, to each of the plurality of air bags such that the manifold can add air or remove air from each of the air bags independently;
   a plurality of pressure sensors, each pressure sensor connected to a respective one of the air bags for measuring a pressure of the respective air bag and issuing a reading based on the measurement; and
   a control system in signal communication with each of the pressure sensors and to the manifold for controlling operation of the manifold based on a calculation of a data set such that each reading is a part of the data set.

2. The weight distribution system for a vehicle as in claim 1 wherein when a first portion of the pressure sensors each issue their reading to the control system indicating a drop in the pressure measurement of the first portion of pressure sensors and a second portion of the pressure sensors issues their reading to the control system indicating a rise in the pressure measurement of the second portion of pressure sensors, the control system issues a change signal to the manifold for the manifold to add air to the air bags associated with the second portion of pressure sensors.

3. The weight distribution as in claim 1 further comprising a GPS unit in signal communication with the control system such that the GPS unit issues a GPS signal to the control system which GPS signal is a part of the data set.

4. The weight distribution system as in claim 3 further comprising a roadway condition system that receives the GPS signal and calculates a roadway condition based on the GPS signal and issues a roadway condition signal and communicates the roadway condition signal to the control system which roadway condition signal is a part of the data set.

5. The weight distribution system as in claim 3 further comprising a weather condition system that receives the GPS signal and calculates a weather condition based on the GPS signal and issues a weather condition signal and communicates the roadway condition signal to the control system which weather condition signal is a part of the data set.

6. The weight distribution system as in claim 1 further comprising a speedometer that measures a speed of the vehicle and issues a speed signal based on the speed and communicates the speed signal to the control system which speed signal is a part of the data set.

7. The weight distribution system for a vehicle as in claim 1 further comprising an input device in signal communication with the control system such that the input device issues override input that is communicated to the control system such that when the control system receives the override input, the control system overrides the set of data and uses the override input to control the manifold.

8. The weight distribution system for a vehicle as in claim 1 further comprising a wireless transmitter in signal communication with the control system such that the control system uses the pressure input from each pressure sensor and converts each such pressure input to calculate a weight amount and sums each of the weight amounts to achieve an overall weight amount such that the transmitter wirelessly transmits the overall weight amount to a receiver.

9. The weight distribution system for a vehicle as in claim 1 further comprising a wireless transmitter in signal communication with the control system such that the control system uses the pressure input from each pressure sensor and converts each such pressure input to calculate a weight amount and sums each of the weight amounts to achieve and overall weight amount such that the transmitter wirelessly transmits the overall weight amount to a receiver via a satellite link.

10. A weight distribution system for a vehicle, the vehicle having a plurality of axles, each axle having a pair of suspension air bags thereon for supporting the weight of the truck onto the axle, the vehicle also having a control system area network that is connected to a set of components of the vehicle, the weight distribution system comprising:
   a manifold adapted to be in fluid flow communication with a source of pressurized air, the manifold also in fluid flow communication, independently, to each of the plurality of air bags such that the manifold can add air or remove air from each of the air bags independently;

a plurality of pressure sensors, each pressure sensor connected to a respective one of the air bags for measuring a pressure of the respective air bag and issuing a pressure reading based on the measurement;

a plurality of height sensors, each height sensor connected to a respective one of the air bags for measuring a ride height of the respective air bag and issuing a height reading based on the measurement; and a control system in signal communication with each of the pressure sensors and each of the height sensors and to the manifold for controlling operation of the manifold based on a calculation of a data set such that each pressure reading and each ride height reading are part of the data set.

11. The weight distribution system for a vehicle as in claim 10 wherein when a first portion of the pressure sensors each issue their pressure reading to the control system indicating a drop in the pressure measurement of the first portion of pressure sensors and a second portion of the pressure sensors issues their pressure reading to the control system indicating a rise in the pressure measurement of the second portion of pressure sensors, the control system issues a change signal to the manifold for the manifold to add air to the air bags associated with the second portion of pressure sensors.

12. The weight distribution system for a vehicle as in claim 10 wherein when a first portion of the height sensors each issue their ride height reading to the control system indicating a drop in the ride height measurement of the first portion of height sensors and a second portion of the height sensors issues their reading to the control system indicating a rise in the ride height measurement of the second portion of height sensors, the control system issues a change signal to the manifold for the manifold to add air to the air bags associated with the first portion of height sensors.

13. The weight distribution as in claim 10 further comprising a GPS unit in signal communication with the control system such that the GPS unit issues a GPS signal to the control system which GPS signal is a part of the data set.

14. The weight distribution system as in claim 13 further comprising a roadway condition system that receives the GPS signal and calculates a roadway condition based on the GPS signal and issues a roadway condition signal and communicates the roadway condition signal to the control system which roadway condition signal is a part of the data set.

15. The weight distribution system as in claim 13 further comprising a weather condition system that receives the GPS signal and calculates a weather condition based on the GPS signal and issues a weather condition signal and communicates the roadway condition signal to the control system which weather condition signal is a part of the data set.

16. The weight distribution system as in claim 10 further comprising a speedometer that measures a speed of the vehicle and issues a speed signal based on the speed and communicates the speed signal to the control system which speed signal is a part of the data set.

17. The weight distribution system for a vehicle as in claim 10 further comprising an input device signal connected to the control system such that the input device issues override input that is communicated to the control system such that when the control system receives the override input, the control system overrides the set of data and uses the override input to control the manifold.

18. The weight distribution system for a vehicle as in claim 10 further comprising a wireless transmitter in signal communication with the control system such that the control system uses the pressure input from each pressure sensor and converts each such pressure input to calculate a weight amount and sums each of the weight amounts to achieve an overall weight amount such that the transmitter wirelessly transmits the overall weight amount to a receiver.

19. The weight distribution system for a vehicle as in claim 10 further comprising a wireless transmitter in signal communication with the control system such that the control system uses the pressure input from each pressure sensor and converts each such pressure input to calculate a weight amount and sums each of the weight amounts to achieve and overall weight amount such that the transmitter wirelessly transmits the overall weight amount to a receiver via a satellite link.

20. The weight distribution system as in claim 10 wherein a fixed height signal representing a fixed height is issued to the control system such that the control system continually poles each of the height sensors for their respective ride height readings and compares the ride height reading for each height sensor against the fixed height and if there is a differential between the two, then the control system issues a signal to the air bag associated with the particular height sensor to either add air or remove air from that air bag until the ride height reading from that height sensor matches the fixed height.

* * * * *